United States Patent [19]

Collins

[11] Patent Number: 5,222,607
[45] Date of Patent: Jun. 29, 1993

[54] HIGH CAPACITY STORAGE UNIT

[76] Inventor: Joseph B. Collins, 206 Lakeside Ave., Pitman, N.J. 08071

[21] Appl. No.: 848,480

[22] Filed: Mar. 9, 1992

[51] Int. Cl.⁵ .............................................. A47F 7/00
[52] U.S. Cl. ....................................... 211/41; 211/169
[58] Field of Search ................... 211/41, 40, 168, 169; 248/188.9

[56] References Cited

U.S. PATENT DOCUMENTS

| | | | |
|---|---|---|---|
| 359,022 | 3/1887 | Marsh | 211/169 X |
| 569,367 | 10/1896 | Wood | 211/169 X |
| 2,635,031 | 4/1953 | Erhardt | 211/41 X |
| 2,817,444 | 12/1957 | Brandell | 211/169 X |
| 3,171,543 | 3/1965 | Nelson et al. | 211/169 X |
| 4,170,392 | 10/1979 | Spevak | 211/169 X |
| 4,600,107 | 7/1986 | Price et al. | 211/41 |
| 4,688,682 | 8/1987 | Price et al. | 211/41 |
| 4,754,885 | 7/1988 | Rich | 248/188.9 X |

OTHER PUBLICATIONS

Promotional publication of Wright Line for Rack 'N Roll ™.

*Primary Examiner*—Robert W. Gibson, Jr.
*Attorney, Agent, or Firm*—Seidel, Gonda, Lavorgna & Monaco

[57] ABSTRACT

A high capacity storage unit comprising a frame, a first plurality of storage locations semi-permanently fixed on the frame, at least one movable panel overlying at least a portion of a vertical elevation of the frame and pivotally movable with respect to the frame between a closed position and an open position, and a second plurality of storage locations semi-permanently fixed on the panel. Preferably, the panel is substantially parallel to the vertical elevation of the frame when the panel is in the open position, so that it lies flat against the frame in that position. When the panel is in its closed position, the panel covers or prevents access to the first plurality of storage locations. The frame includes a top frame portion.

31 Claims, 4 Drawing Sheets

HIGH CAPACITY STORAGE UNIT

FIELD OF THE INVENTION

The present invention relates to storage units which provide a high storage capacity in a minimum of floor space. The present invention is particularly suited for storage of computer tapes or tape cartridges, but is also useful in any situation where high capacity storage is desired, such as storage of paper files and the like.

BACKGROUND OF THE INVENTION

Storage space, or rather the lack of it, is a big problem in many areas, such as computer operations where it is desired to store large numbers of tapes or tape cartridges containing computer data for frequent retrieval or for archival storage. Similar problems exist in other contexts, such as libraries, file rooms, and the like. Floor space is usually at a premium and the cost per square foot can be quite expensive. Normal business growth requires either more space for storage or more efficient use of existing space.

Prior attempts to solve storage problems have been only partially successful. One approach, as shown in U.S. Pat. Nos. 4,600,107 and 4,688,682. has been to increase the storage density on fixed shelves by doubling the number of articles stored on the shelves. This approach seeks to eliminate "dead space" between shelves. However, to accommodate growth, more storage racks, and therefore more floor space, are required.

Another approach seeks to increase storage capacity using a combination of fixed and sliding storage units. In such systems, a bank of fixed units is combined with one or more sliding units in front of the fixed units. However, while increasing storage capacity, sliding unit designs restrict access to the fixed units. Access to the fixed units can be restricted by up to 80 percent. In addition, with sliding unit installations, an operator is required to manually shift several hundred pounds of stored material contained in a sliding unit in order to gain access to the fixed units behind the sliding units. This may require as much as 1200 pounds of effort. In addition, sliding units move on rollers in tracks, and often malfunction, delaying access to materials stored in the fixed units.

The present invention provides an innovative solution to the problem of increasing storage density without excessively restricting access to stored materials and while maximizing ease and speed of operation. The present invention concentrates the maximum amount of storage in the minimum amount of floor space. On average, the invention enables increases in storage capacity of up to 40 percent or more. The invention has a minimum negative impact on productivity, because it provides a user with fulltime access to materials stored in inner compartments. Sliding unit designs limit access to 20 percent of materials stored in the inner compartments. Unlike sliding unit designs, the invention is very mobile, leading to significant savings in labor expense during installation or reorganization activities by eliminating the need for assembly or leveling. Sliding unit designs require extensive and timely consuming installation, assembly and leveling operations, and require disassembly if they need to be relocated. The present invention is highly mobile and can be quickly and simply installed or relocated as required.

These and other objects and advantages of the invention will become apparent from the accompanying description of the invention.

SUMMARY OF THE INVENTION

The present invention is directed to a high capacity storage unit comprising a frame, a first plurality of storage locations semi-permanently fixed on said frame, at least one movable panel means overlying at least a portion of a vertical elevation of said frame and pivotably movable with respect to said frame between a closed position and an open position, and a second plurality of storage locations semi-permanently fixed on said panel means. In a preferred embodiment of the invention, the panel means is substantially parallel to the vertical elevation of the frame when the panel means is in the open position, so that it lies flat against the frame in that position.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE INVENTION

Figure 1:
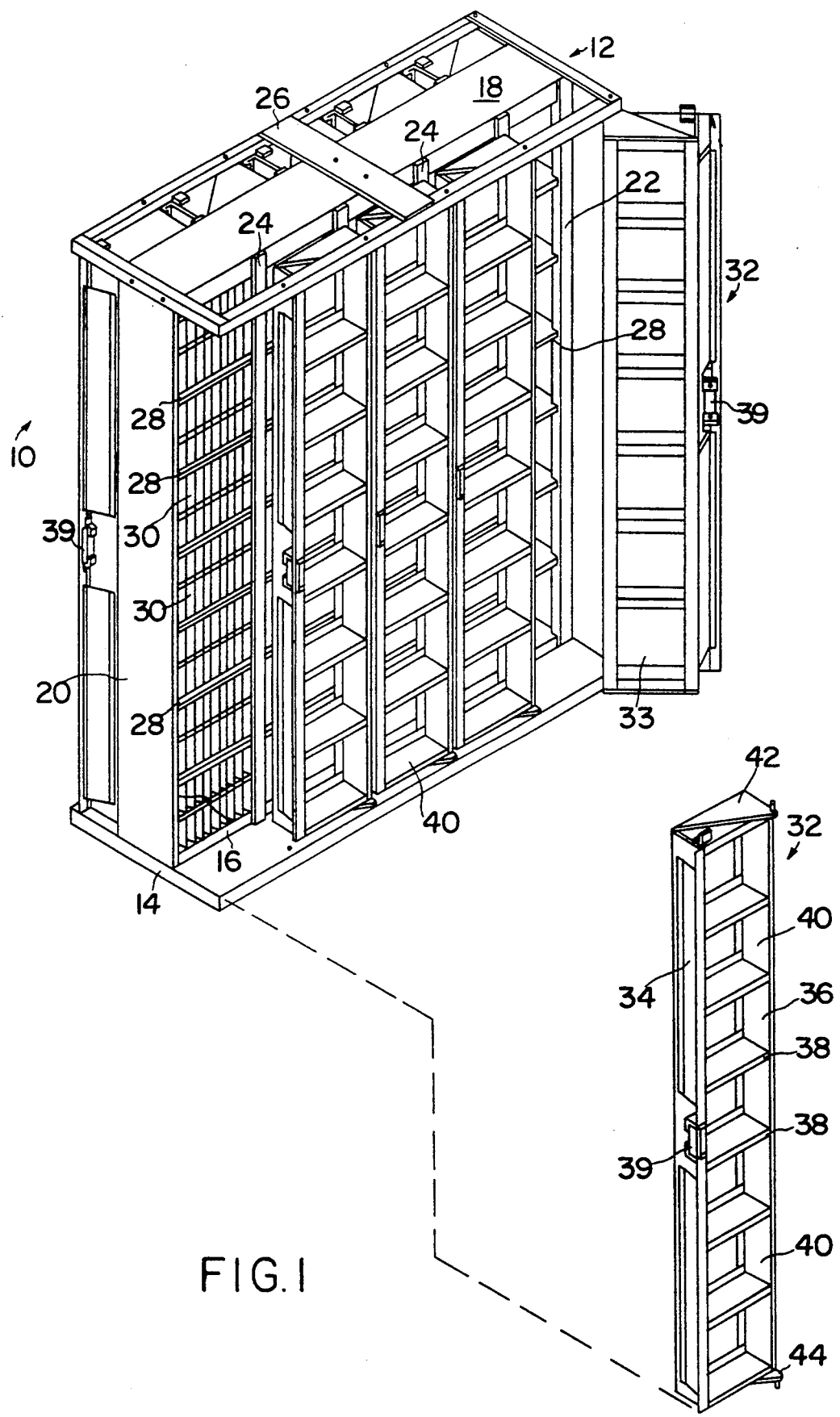
FIG. 1 is an isometric view of a high capacity storage unit according to the present invention, partially exploded.

Referring now to the drawings, wherein like numerals indicate like elements, there is shown in FIG. 1 a storage unit 10 according to the present invention. Storage unit 10 comprises a frame 12 including a base 14, a horizontal bottom frame member 16 on base 14, a horizontal top frame member 18 and upright side frame members 20 and 22. If desired, intermediate upright frame members 24 are provided to strengthen frame 12 and subdivide the interior volume of frame 12. Frame 12 is completed by a top frame 26 above top frame member 18. Top frame 26 has substantially the same dimensions and shape as base 14, and both define the outer envelope of storage unit 10.

Frame 12 further includes a plurality of generally horizontal shelves 28. Shelves 28 may be either permanently affixed to frame 12, such as by rivets 29, or they may be movably mounted in frame 12 so as to be adjustable for different shelf spacings as may be desired from time to time. Shelves 28 support a plurality of storage locations 30 which are semi-permanently fixed on frame 12. By "semi-permanently" is meant that the shelves 28 supporting the storage locations 30 remain fixed with respect to frame 12 and are not movable with respect to frame 12 unless shelves 28 are intentionally removed and rearranged to accommodate different storage requirements. However, in normal use, where articles are stored in and retrieved from storage locations 30, shelves 28 do not move with respect to frame 12.

Storage locations 30 may be adapted for any type of articles to be stored. For example, storage locations 30 may comprise tape cartridge storage units, tape reel storage units, file storage units, and so forth. Such storage units, adapted to fit onto shelves, are known per se, and need not be described here in detail. It should be understood that the precise configuration of storage locations 30, and the particular articles being stored, are not crucial to the present invention, and that the invention encompasses storage of a wide variety of articles.

A plurality of panel means, or doors, 32 are pivotably mounted on frame 12 between base 14 and top frame 26. Each panel means, or door, 32 comprises a rear panel 33 on the interior surface of door 32 and a pair of upright sides 34 and 36 spanned by a plurality of shelves 38. Door 32 may also be provided with a handle or pull 39, to facilitate opening and closing door 32. The exterior of door 32 is open to the shelves for easy access to them when the door is closed, as best seen in FIG. 1. As with shelves 28, shelves 38 may be either permanently fixed to door 32, or may be adjustable to accommodate storage of different size articles. Shelves 38 thus define a second plurality of storage locations 40 which are semi-permanently fixed on door 32. Preferably, but not necessarily, shelves 38 are disposed at a small angle to the horizontal, downward away from the exterior of door 32, so that articles stored in door 32 will be less likely to become dislodged and fall when door 32 is moved.

To enable doors 32 to be easily opened and closed, each door 32 is pivotably mounted between top and bottom pivot plates 42 and 44, respectively. Each pivot plate supports a pivot pin 46 and 48, respectively. Top pivot pin 46 is received in top pivot bushing 50, which is in turn mounted in a corresponding opening in cross-member 52 of top frame 26. Similarly, bottom pivot pin 48 is received in bushing 54, which is in turn supported in a corresponding opening in base 14. Preferably, bushings 52 and 54 are self-lubricating. Pivot pins 46 and 48 and bushings 50 and 54 enable door 32 to easily pivot between the closed and open positions.

Figure 2:
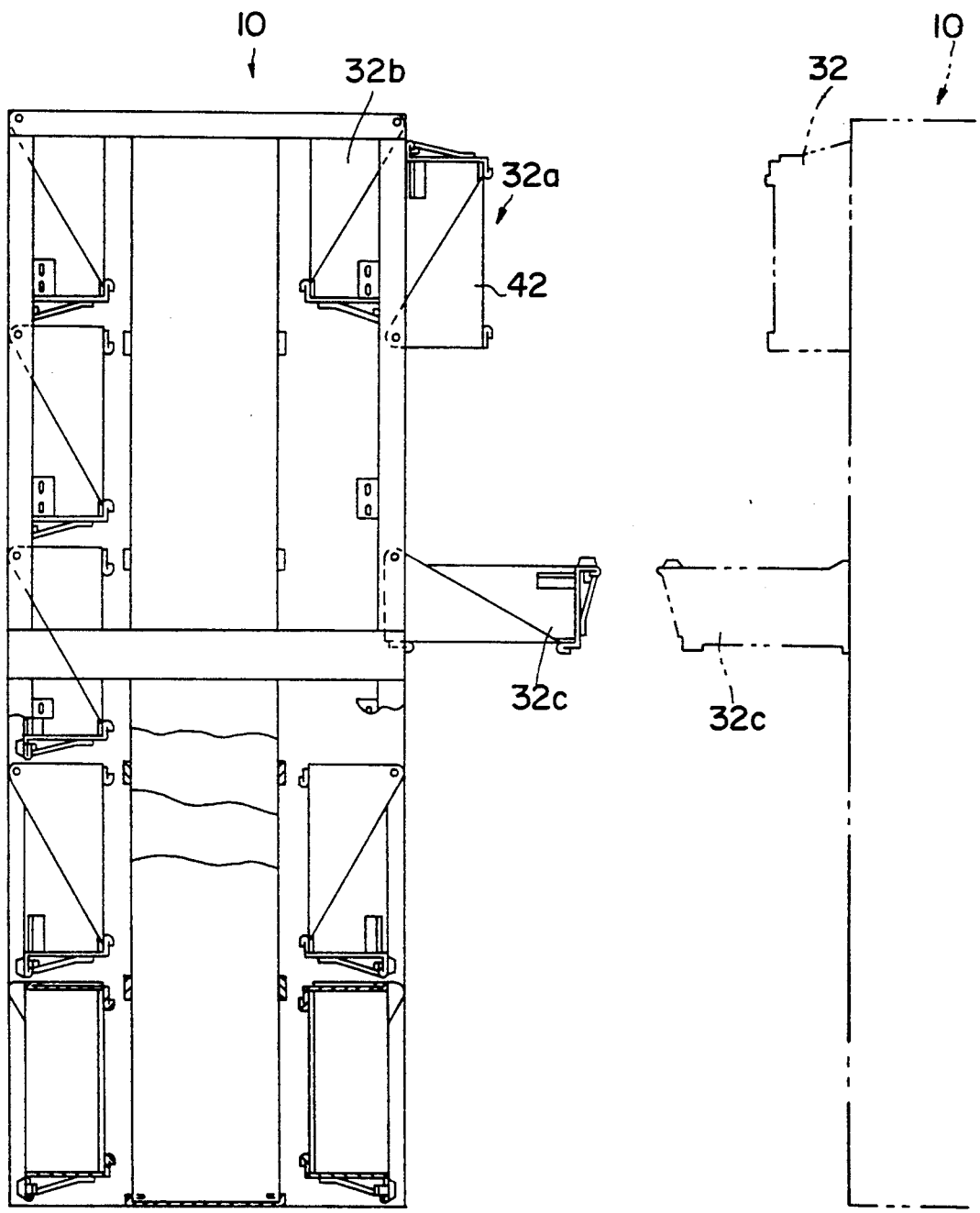
FIG. 2 is a top plan view of a storage unit according to the invention, showing the movable panel means in the open position.
Figure 3:
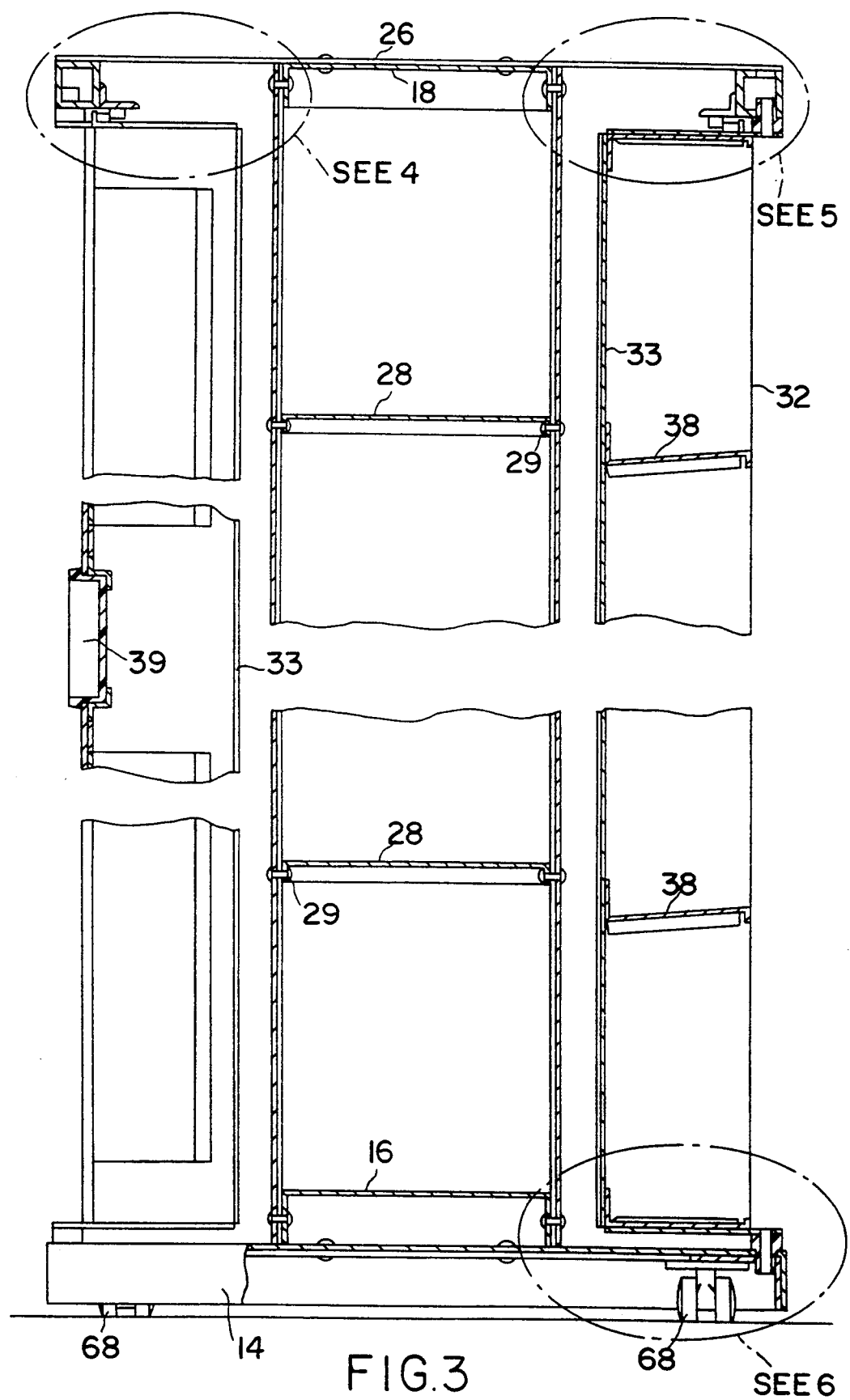
FIG. 3 is a side elevational view, partially in section, showing internal features of the invention not easily visible from the exterior.

A unique feature of the present invention is that doors 32 are pivotable between a closed position and an open position, such that when the door is in the open position, it is substantially parallel to and lies flush with a vertical elevation of the frame. Unlike an ordinary hinge, which has a pivot axis essentially along a side edge of a door to which it is mounted, pivot plates 42 and 44 extend past the side edges of doors 32, so that the pivot axis of doors 32 is not along a side edge but is located outboard of door 32. Because of the outboard pivot axis, pivot plates 42 and 44 allow doors 32 to swing out and pivot 180° with respect to frame 12, so that when a door 32 is fully open, it lies flat against and flush with the vertical front surface of storage unit 10, as best seen in FIG. 2. In FIG. 2, a door 32a is illustrated in the fully-open position, in which it overlies an adjacent door 32b, such that the front surface of open door 32a is substantially flush with the front surface of closed door 32b. This feature enables an open door 32a to be located flush with storage unit 10, which keeps door 32a safely out of the way when open. This permits multiple storage units 10 to be located very close together without sacrificing aisle space between adjacent storage units when the doors are open for access to the interior storage locations 30. As long as sufficient clearance is provided between adjacent storage units, such that the doors will not interfere when being opened or closed, such as shown with partially open doors 32c, multiple storage units 10 can be closely spaced for maximum storage in the minimum amount of floor space.

Figure 4:
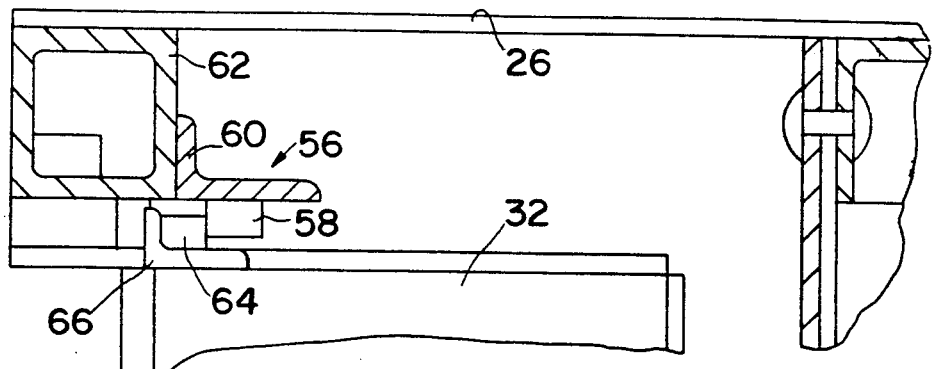
FIG. 4 is an enlarged partial sectional view of a portion of FIG. 3.
Figure 5:
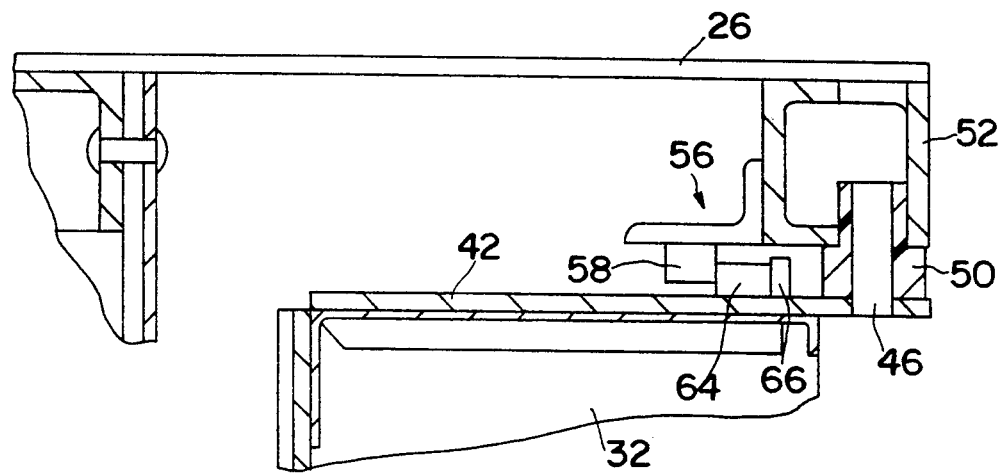
FIG. 5 is an enlarged partial sectional view of a portion of FIG. 3.
Figure 6:
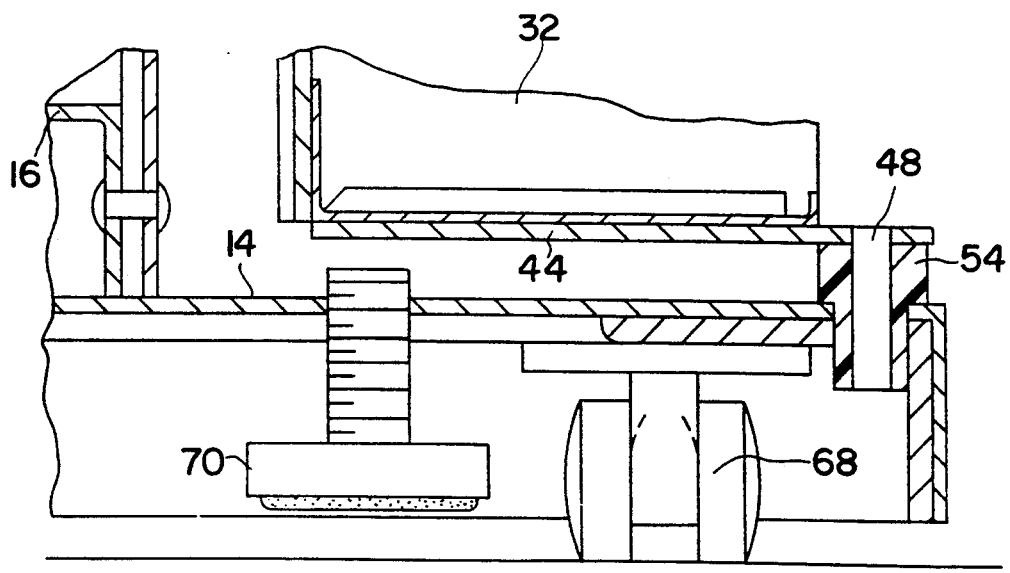
FIG. 6 is an enlarged partial sectional view of a portion of FIG. 3.

Doors 32 may be latched in the closed position, such as by latch means 56. As best seen in FIGS. 4 and 5, latch means 56 preferably comprises a magnetic latch having a first magnetic member 58 supported on top frame 26, such as by bracket 60 mounted to cross-member 62. First magnetic member 58, a second member magnetic 64 which is attached to door 32, such as by bracket 66. Thus, as those skilled in the art will understood, when door 32 is pivoted into the closed position, the magnetic attraction between first magnetic member 58 and second magnetic member 64 will releasably latch door 32 in the closed position, so that door 32 will not inadvertently or unexpectedly open. However, magnetic latch 56 will readily release door 32 when it is to be opened. Of course, any other suitable latch means may be used without departing from the invention. In addition, if desired, door 32 may be fitted with a lock (not shown), to provide restricted access to the inner storage locations 30.

Although storage locations 40 in door 32 are illustrated as being on the exterior of door 32, they may, if desired, be provided on the interior of door 32 so that access to articles stored in storage locations 40 is not accessible from outside storage unit 10. In that case, panel 33 would be located on the exterior surface of door 32, and the interior of door 32 would be open to shelves 38 to provide access to storage locations 40 only when door 32 is open. This is a particular advantage where the articles being stored require restricted access, such as for security reasons, or where storage unit 10 is to be located in an area subject to shock, such as an earthquake-prone area. In those cases, where storage locations 40 are on the interior of door 32, door 32 may be latched and/or locked closed, so that the contents of storage unit 10 are not accessible and will not pose a hazard of falling articles, for example in the event of an earthquake. In those cases where storage locations 40 are located on the inside of door 32 for security reasons, door 32 may be provided with a suitable lock (not shown), as mentioned above, to restrict access to stored articles.

Storage unit 10 may be either fixed or mobile, as desired. Preferably, storage units 10 are mobile and are provided with a plurality of casters 68 on the underside of base 14 to enable storage unit 10 to be moved easily from one location to another. Casters 68 may be of the type provided with a lock, so that when storage unit 10 is moved to its desired location, casters 68 may be locked against further movement. Alternatively, screw-type floor brakes 70 may be provided to anchor storage unit 10 in its desired position. An added advantage of floor brakes 70 is that they enable storage unit 10 to be leveled very easily in the event the floor supporting unit 10 is uneven or has a slight pitch. As those skilled in the art will appreciate, leveling unit 10 better permits free movement of doors 32 and resists unwanted opening or closing of the doors.

As shown in the figures, the storage unit of the present invention is a double-sided unit, i.e., it has doors on opposite sides so that articles may be stored on either side, preferably both sides, of the storage unit. This configuration enables the storage unit to be free-standing and still give maximum access to and storage space of articles in the storage unit. In addition, free-standing double sided units can be arranged to define aisles. However, it should be understood that the storage unit of the invention may also be single-sided, i.e., having doors on only one side, in which case the storage unit can be either free standing or placed against a wall.

It will be appreciated that the storage unit of the present invention nearly doubles the storage space offered by prior storage racks. For example, the storage rack disclosed in U.S. Pat. No. 4,688,682 is said to provide the capacity for 110,400 tape cartridges in a 40×44 foot (1,760 square feet) installation. In contrast, the storage unit of the present invention permits storage of over 200,000 such cartridges in the same area, nearly double the storage capacity of prior racks.

The present invention may be embodied in other specific forms without departing from the spirit or essential attributes thereof and, accordingly, reference should be made to the appended claims, rather than to the foregoing specification, as indicating the scope of the invention.

I claim:

1. A freestanding high-capacity storage unit comprising:
   (a) a frame including a top frame portion,
   (b) a first plurality of storage locations semi-permanently fixed on said frame,
   (c) at least one movable panel means overlying at least a portion of a vertical elevation of said frame and pivotally movable with respect to said frame between a closed position and an open position, the movable panel means covering at least a portion of the first plurality of storage locations in its closed position, and
   (d) a second plurality of storage locations semi-permanently fixed on said panel means.

2. A storage unit according to claim 1, wherein said panel means is substantially parallel to the vertical elevation of said frame when said panel means is in the open position.

3. A storage unit according to claim 1, wherein said first and second storage locations comprise shelves.

4. A storage unit according to claim 1, wherein said second storage locations are accessible from an exterior portion of said panel means.

5. A storage unit according to claim 1, wherein said second storage locations are accessible from only an interior portion of said panel means.

6. A storage unit according to claim 1, wherein said panel means comprises a door.

7. A storage unit according to claim 1, further comprising caster means for enabling said storage unit to be easily moved from place to place.

8. A storage unit according to claim 7, further comprising brake means for securing said unit in place at a desired location.

9. A freestanding high-capacity storage unit comprising:
   (a) a frame including a top frame portion,
   (b) a first plurality of support means adjustably fixed within said frame,
   (c) a first plurality of storage locations supported by said first plurality of support means,
   (d) at least one door means overlying at least a portion of a vertical elevation of said frame and pivotable with respect to said frame between a closed position in which said door means at least partially prevents access to said first plurality of storage locations and an open position in which said door means permits access to at least a portion of said first plurality of storage locations, said door means in said open position being substantially parallel to the vertical elevation of said frame,
   (e) a second plurality of support means adjustably fixed within said door means, and
   (f) a second plurality of storage locations supported by said second plurality of support means.

10. A storage unit according to claim 10, further comprising caster means for enabling said unit to be selectably moved from one location to another, and brake means associated with said caster means for securing said unit in position in a desired location.

11. A storage unit according to claim 9, wherein said second storage locations are accessible from an exterior portion of said panel means.

12. A storage unit according to claim 9, wherein said second storage locations are accessible from only an interior portion of said door means.

13. A freestanding high-capacity storage unit comprising:
   (a) a frame including a top frame portion,
   (b) a first plurality of shelves adjustably fixed within said frame,
   (c) a first plurality of storage locations supported by said first plurality of shelves,
   (d) door means overlying a vertical elevation of said frame and pivotable with respect to said frame between a closed position in which said door means prevents access to said first plurality of storage locations and an open position in which said door means permits access to said first plurality of storage locations, said door means in said open position being substantially parallel to the vertical elevation of said frame,
   (e) a second plurality of shelves adjustably fixed within said door means,
   (f) a second plurality of storage locations supported by said second plurality of shelves,
   (g) caster means for enabling said unit to be selectably moved from one location to another, and
   (h) brake means associated with said caster means for securing said unit in position in a desired location.

14. A storage unit according to claim 13, wherein said second storage locations are accessible from an exterior portion of said panel means.

15. A storage unit according to claim 13, wherein said second storage locations are accessible from only an interior portion of said door means.

16. A storage unit according to claim 1 wherein said top frame portion includes a horizontal top frame member extending across the top frame portion.

17. A storage unit according to claim 1 wherein said top frame portion includes a peripheral top frame around the periphery of the top frame portion.

18. A storage unit according to claim 1 wherein said top frame portion includes a horizontal top frame member extending across the top frame portion and a peripheral top frame around the periphery of the top frame portion, the peripheral top frame partially overlying the horizontal top frame member.

19. A storage unit according to claim 1, further including a substantially planar base, and wherein the top frame portion is substantially planar.

20. A storage unit according to claim 1, further including pivot means for allowing the movable panel means to pivotally move with respect to said frame, the pivot point of the pivot means located a predetermined distance away from a corner of the movable panel means.

21. A storage unit according to claim 1, further comprising caster means for enabling said storage unit to be easily moved from place to place and brake means for securing said unit in place at a desired location, wherein the caster means and brake means are formed independent from one another.

22. A storage unit according to claim 9 wherein said top frame portion includes a horizontal top frame member extending across the top frame portion.

23. A storage unit according to claim 9 wherein said top frame portion includes a peripheral top frame around the periphery of the top frame portion.

24. A storage unit according to claim 9 wherein said top frame portion includes a horizontal top frame member extending across the top frame portion and a peripheral top frame around the periphery of the top frame portion, the peripheral top frame partially overlying the horizontal top frame member.

25. A storage unit according to claim 9, further including a substantially planar base, and wherein the top frame portion is substantially planar.

26. A storage unit according to claim 9, further including pivot means for allowing the door means to pivotally move with respect to said frame, the pivot point of the pivot means located a predetermined distance away from a corner of the door means.

27. A storage unit according to claim 13 wherein said top frame portion includes a horizontal top frame member extending across the top frame portion.

28. A storage unit according to claim 13 wherein said top frame portion includes a peripheral top frame around the periphery of the top frame portion.

29. A storage unit according to claim 13 wherein said top frame portion includes a horizontal top frame member extending across the top frame portion and a peripheral top frame around the periphery of the top frame portion, the peripheral top frame partially overlying the horizontal top frame member.

30. A storage unit according to claim 13, further including a substantially planar base, and wherein the top frame portion is substantially planar.

31. A storage unit according to claim 13, further including pivot means for allowing the door means to pivotally move with respect to said frame, the pivot point of the pivot means located a predetermined distance away from a corner of the door means.

* * * * *